Nov. 3, 1942.  W. F. PETERSON ET AL  2,300,466
QUIET FLOW RETARDING DEVICE
Filed Nov. 29, 1938
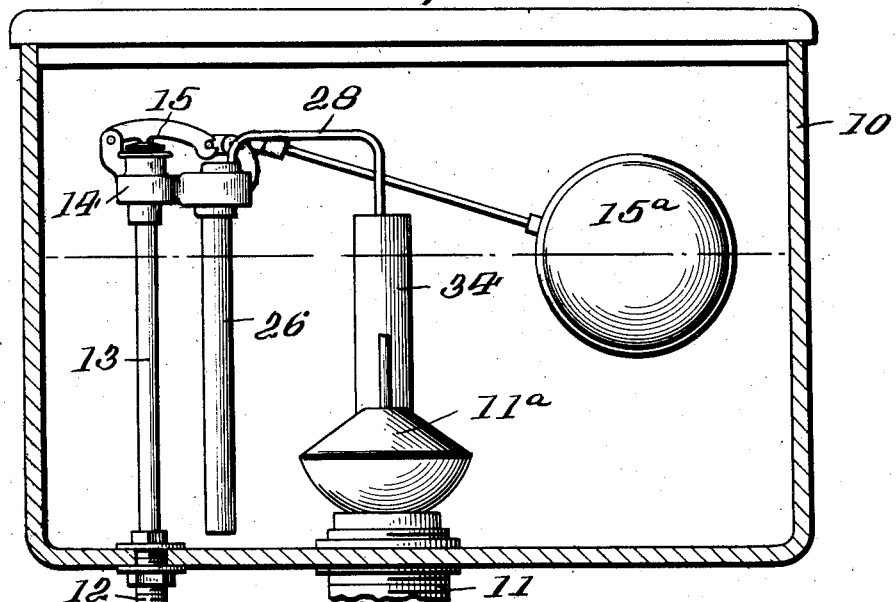
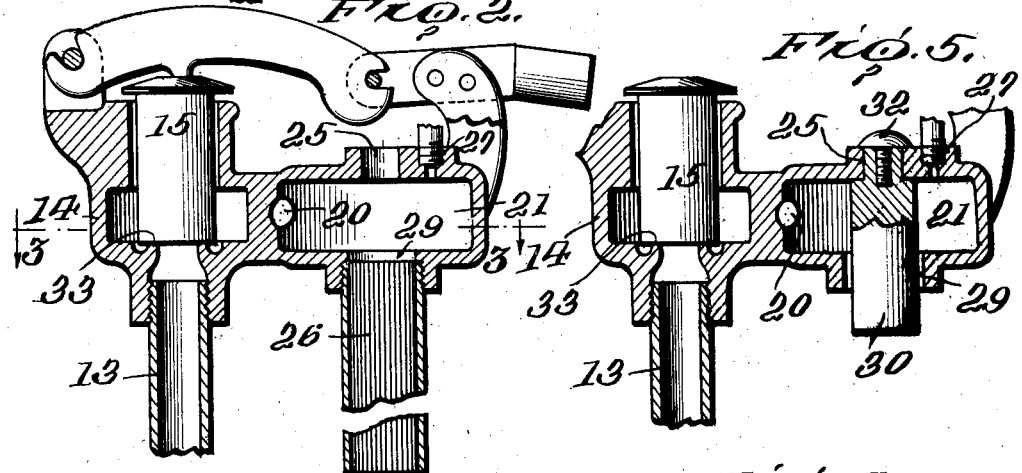
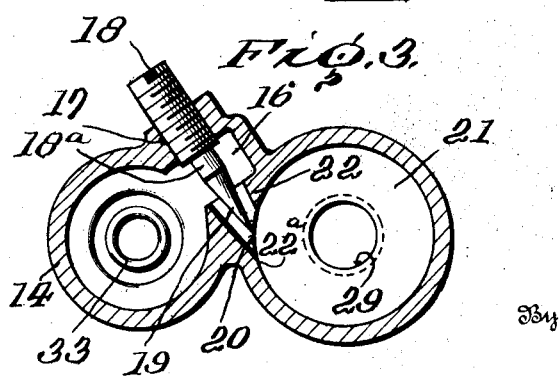
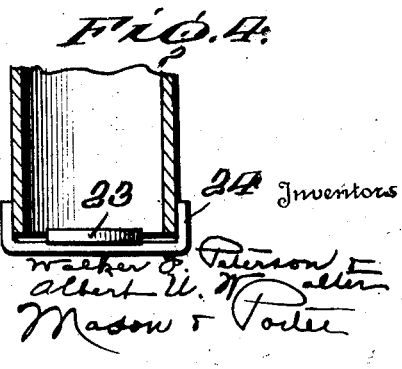

Patented Nov. 3, 1942

2,300,466

UNITED STATES PATENT OFFICE 2,300,466

QUIET FLOW RETARDING DEVICE

Walker F. Peterson and Albert U. Walter, Baltimore, Md.

Application November 29, 1938, Serial No. 243,036

18 Claims. (Cl. 137—68)

This invention relates to new and useful devices for throttling or retarding the flow of liquid with substantial quietness and permitting the combination therewith of means for preventing back-syphoning.

An object of the invention is to provide a simple and efficient means for quietly retarding the flow of liquid at some point in the distributing system so as to reduce the velocity of flow in the rest of the system to such an extent that objectionable noise will be reduced or eliminated.

A particular object of the invention is to provide a simple and efficient means at or near the point of discharge into an open vessel for quietly retarding the flow of the liquid and dispersing the liquid in the vessel without undue turbulence.

A further object of the invention is to provide a simple, positive and quiet means for providing an automatic air inlet or vacuum breaker, without moving parts, between a discharge control valve and a submerged outlet.

Further features and objects of the invention will appear in the course of the following specifications and claims.

In our prior Patents No. 2,037,737, No. 2,089,223 and No. 2,089,224 on Quiet flow retarding devices we have discussed some of the causes of noise in retarding or throttling the flow of liquids. Among the causes of noise are: (1) a high velocity jet (as from an orifice) striking a general body of still or low velocity liquid which causes cavitation and results in noise; (2) a low pressure downstreamward of an orifice; and (3) abrupt changes in the velocity or direction of the flow stream.

A basic idea of the present invention is to provide a device (a) wherein the high velocity jet from an orifice encounters a body of liquid of approximately the same velocity and flowing in approximately the same direction, (b) wherein a relative high pressure is maintained immediately at and immediately beyond the discharge end of an orifice, and (c) wherein there is a gradual reduction of pressure in the liquid from the zone of relative high pressure to the zone of atmospheric pressure, and (d) wherein the velocity of the flow stream is reduced gradually. The effects set forth in (a), (b) and (c) are accomplished by having an orifice which opens into a chamber that is so located that the jet from the orifice is substantially tangential to the peripheral surface of the chamber in which the liquid may circulate as an annular body, and by having the outlet from said chamber at some point spaced inwardly from its periphery. In this way the jet imparts a rotary motion to the body of liquid in the chamber; the rotating body of liquid in the chamber at its periphery has approximately the same velocity and direction as the jet itself; a high pressure is thus maintained at the discharge end of the orifice due to the centrifugal force exerted by the rapidly rotating body of liquid and there is a very gradual transition from the zone of high pressure toward atmospheric pressure as the liquid passes from the chamber wall toward the outlet; and a gradual reduction of the velocity of the flow stream is effected after it leaves the chamber and is brought to and dispersed into liquid already present in the vessel to be supplied.

Since a toilet flushing tank with its ball-cock or flat valve provides a common instance of an apparatus in which noise is objectionable, and in which it is desirable to retard the flow and to provide an air inlet or vacuum breaker against back-syphonage, such an apparatus is used illustratively in this description as an example of employment of the retarding device combined with the vacuum breaker.

In the accompanying drawing:

Fig. 1 is an upright sectional view through a toilet tank having therein a retarding device and vacuum breaker embodying the present invention.

Fig. 2 is an upright sectional view on a larger scale through the float valve structure, the retarding device and the syphon breaker.

Fig. 3 is a sectional view along the line 3—3 of Fig. 2.

Fig. 4 is a sectional view of the discharge end of the discharge tube showing a modification of that part from the form shown in Fig. 2.

Fig. 5 is an upright sectional view of a modified construction, through the float valve structure and the retarding device when employed as a ball-cock without the siphon breaker.

In Fig. 1, the flush tank or receptacle 10 is conventionally illustrated as having a discharge 11 controlled by the valve 11a, and having a water supply pipe 12. These pipes pass through the bottom of the tank and are sealed in the usual manner. Inside the tank the riser supply connection 13 leads to the float valve casing 14, which has the usual valve closure member 15 movable therein to shut off the flow of water. This closure member is controlled by the usual valve float 15a and associated linkage. The riser supply connection 13 is sufficiently long so that the valve seat 33 in the valve casing 14 is above the top of overflow tube 34.

Referring to Fig. 2 and Fig. 3, a chamber 21 is connected to the valve head or casing 14 by the regulatable port 22 having an orifice 20 opening into the chamber. The walls of the chamber 21 are preferably cast integral with the valve casing 14. The peripheral surface of the chamber is preferably circular in section about a vertical axis, that is, such surface is a figure of revolution. As illustrated in Fig. 2, the inside of the chamber 21 is cylindrical. It may, however, be of two or more diameters or of any substantially annular form, as the shape of its cross-section is not of particular importance. It is presently preferred to have the interior surface of the chamber 21 relatively smooth. A smooth cast finish, free from fins or crevices, is satisfactory. It is not necessary to have a machine finish.

An air inlet opening 25 is provided in the center of the top of the chamber 21. A refill opening 27 is also provided in the top of the chamber 21, being located somewhat off-center, that is, radially between the maximum radius of the discharge and the peripheral wall of the chamber itself. This opening 27 has a threaded wall and receives the refill tube 28. In practice, the opening 27 is spaced from the plane through the axes of the closure member 15 and the chamber 21, so that when the refill tube is inserted it will not interfere with the float linkage.

In the center of the bottom of the chamber 21, a discharge opening 29 is provided. This opening 29 is substantially larger than the opening 25 in the top of the chamber and receives the discharge tube 26, the inside diameter of which is also substantially larger than the opening 25. The discharge tube 26 is of such length that its lower end is always submerged during the practical operation of the tank.

The walls of the discharge tube 26 are preferably provided with a roughened internal surface. By "roughened" surface throughout these specifications and claims is meant a surface having depressions and elevations so that the surface is similar to that of ordinary sand paper of the type known commercially as #3/0 to #3, or similar to that resulting from scoring grooves spaced 16 to 80 to the inch and having shapes like those of screw threads; or similar to the surface of a single or double-cut file with a coarseness from bastard to dead smooth or a knurled surface of like spacing. In the case of grooves, it is preferred that the scoring be axial but it may be in the nature of a spiral of very coarse pitch.

The port 22 may be made by use of a core between the valve casing 14 and the chamber 21 but because of its size it is preferred to provide a hollow offset 16 in the valve casing. In this case, the casing 14 has a hole 17 drilled therethrough, and through this opening the port 22 is drilled. If it is not desired to have the device adjustable for different supply pressures and for different flow rates, the hole 17 is then plugged. It is preferred, however, to thread the hole 17 and screw therein a needle valve member having a stem 18, a reduced portion 18a of less diameter than the smallest diameter of the port, and a conical end 19 which tapers toward a point. The reduced portion 18a and the conical end 19 of the needle valve coact with the wall of the regulatable port, which has substantially the same taper, for regulating the flow. It has been found desirable to make the double or apex angle of the conical taper between 15° and 60°. The function is to regulate the flow and not to shut it off.

The size of the orifice 20 is so designed that the maximum flow desired is obtained at the minimum supply pressure when the needle valve is sufficiently withdrawn so that it does not reduce the effective area of the orifice. Regulation of the flow for higher pressures is obtained by screwing the needle valve 19 into the port. It has been found that when the small diameter of the regulatable port 22 (that is, of the orifice 20) is $\frac{7}{32}$ inch and the angle of the taper of the port and of the end 19 of the stem is 20°, and when the inside diameter of the chamber is 1⅝ inches with the inside length $\frac{9}{16}$ inch and the air inlet opening ⅜ inch, and the inside diameter of the discharge tube 26 is $\frac{11}{16}$ inch, that a substantially quiet flow of a minimum of 3 gallons and a maximum of 6 gallons per minute can be obtained when the supply pressure varies from 15 to 100 pounds gauge.

Considerable leeway is permissible in the location of the regulatable port 22. While it is preferred to locate the orifice so that the issuing jet is approximately tangential to the inner peripheral wall of the chamber, the port may in certain cases be located with its axis at a rather acute angle with the inner face of the end wall. The actual inlet may even be axial in one of the end walls with a deflector in the chamber, which gradually deflects the stream. The principal functions of the jet are to supply the water and to impart an annular whirling motion to the body of water in the chamber 21. The angle between the axis of the regulatable port 22 and the radius from the axis of the chamber 21 to the farther point 22a of the orifice 20 may be substantially greater than 90°. When this angle is somewhat greater than 90°, the efficiency of the device is not essentially lessened and the manufacturing problems are simplified.

When the tank 10 is flushed and the float valve opens, the jet or flow stream from the regulatable port 22 is deflected by the inner wall of the chamber 21 and the entire body of water within the chamber 21 is set up in a general rotary motion of relatively high velocity. Water already in the chamber meets the jet from the orifice at a relatively high velocity and its direction of flow is nearly the same as that of the jet. This relatively small difference in velocity and direction materially reduces the tendency to cavitation and noise. Due to the centrifugal force of the water in the chamber, a pressure is maintained where the jet enters the chamber. In this way the tendency to cavitation and noise is further reduced.

The rapidly rotating body of water in the chamber 21 increases in radial thickness until its inner surface (which is substantially circular in section) is of less diameter than the inside of the discharge tube 26. The water then flows into the discharge tube 26, at the same time maintaining its fast rotary motion. Due to centrifugal force from this fast rotary motion, the water passes down the discharge tube 26 as a relative thin sheet hugging the walls with a column of air inside. If the high rotary motion within the discharge tube 26 is not retarded as by roughening or deflected into axial motion, the flow stream discharges from the bottom of the tube at a high velocity and carries with it part of the column of air in the center and therewith the velocity, form, and direction of the flow stream, particularly at the higher supply pressures, tend to cause noise as this flow stream encounters water already in the vessel. Further, the air, thus carried into the water in the tank, causes a disagreeable bubbling noise within the tank.

It has been found that, by roughening the inner surface of the discharge tube 26 as above described, the rotary motion is sufficiently retarded and the centrifugal force sufficiently reduced so that the flow stream no longer hugs the wall of the tube in the lower portion but fills the entire tube and eliminates the air column from this portion of the tube. The rapid rotary motion of the liquid, which initially is in a thin sheet hugging the walls, is thus converted to a great extent into a relatively slow axial motion of a mass of liquid extending over the entire area of the tube. To secure these results with roughened surfaces, the tube must be quite long: about 10 inches has been found a satisfactory length for employment in toilet tanks supplied by city water mains which carry up to 100 pounds pressure per square inch. In a ball-cock or float valve as illustrated, this works out very well as the length of the discharge tube should extend below the minimum water level in the tank.

The inside diameter of the discharge tube 26 is made sufficiently larger than the diameter of the air inlet opening 25 on the top of the chamber 21, so that the inner surface of the rotating body of the water in chamber 21 does not come up to the edge of the air inlet opening 25, but flows down along the inside surface of the tube 26. In this way no water is discharged through the opening 25, during the regular operation of the ball-cock. As the valve seat 33 of the valve casing 14 is always substantially above the top of the overflow tube 34, the air inlet opening 25 is always exposed to the atmosphere. If the pressure in the supply connection 13 falls below atmospheric and if for any reason the valve closure member 15 is held off the seat 23, air will be sucked through the opening 25 instead of water being sucked up from the discharge tube 26.

Such a vacuum-break is of commercial importance, as the laws and regulations of many cities require that no back-siphoning should occur in case the city water pressure fails.

Instead of roughening the inner surface of the discharge tube 26 for the gradual retardation of the rotating column of the flow stream, a baffle may be provided at the center portion of the outlet end of the discharge tube in order to prevent the center column of air within the tube 26 from being carried into the tank, and this baffle also acts with the tube to shape the flow stream into a sheet of substantially regular form as it encounters the liquid already present in the vessel to be supplied. An example of such a baffle is shown in Fig. 4. A circular plate 23 is suspended across the outlet end of the discharge tube by means of a narrow metal strip 24 which is soldered or otherwise attached to both the plate 23 and the tube 26. The size of the plate 23 may be determined according to the diameter and length of the tube 26 and the annular velocity of the stream within the tube, and should be large enough to prevent the emission of air without causing an excessive retardation of the flow stream between the plate and the wall of the tube.

When it is desired to use the device as a quiet ball cock without the anti-syphon feature, a preferred construction is shown in Fig. 5. The valve casing 14, the regulatable port 22 and the chamber 21 with a duct providing the discharge opening 29, the opening 25 in the center of the top of the chamber and its refill opening 27 are the same as in Figs. 2 and 3. In this form, the reduced upper end of a cylindrical member 30 is located in the opening 25 and held rigidly in place, as by the screw 32. The cylindrical member 30 extends substantially below the lower edge of the outlet or discharge opening 29 of the chamber 31 and is of such diameter that there is no substantial retarding effect on the flow stream due to the annular space between the cylinder 30 and the wall of the discharge opening 29.

The cylindrical member 30 has a function like that of the plate 23, and co-acts with the wall of the discharge opening 29 in shaping the flow stream, as it enters the water already in the tank, into sheet form of substantially regular shape. It also prevents back currents from flowing up from the tank into the center portion of the flow stream and causing a pronounced and disagreeable noise.

While either the tube with the interior walls roughened or with the baffle across the bottom, as described above, may be used, when the opening 25 is closed, to function as a quiet ball cock without the anti-syphon feature, the form illustrated in Fig. 5 with the cylindrical member 30 has the advantage of requiring less space, as a shorter riser connection 13 may be used and the body of the ball cock located near the bottom of the tank.

While a preferred form of construction and employment has been shown and described, it will be understood that the invention is not limited to this, as the same is employed merely by way of illustration; and many changes in the construction and arrangement may be effected without departing from the scope of the appended claims.

What is claimed is:

1. A quiet flow retarding device for a tank having a discharge orifice located above the bottom of the tank whereby a water seal is maintained therein, a valve structure for controlling the delivery of water into the tank, and an overflow for determining the maximum level of water in the tank, comprising a structure having a chamber in which a body of liquid may be set into whirling movement about a vertical axis, a restricted port through which water may be delivered from said valve structure into said chamber at high velocity and in a direction substantially tangential to the internal peripheral wall surface of the chamber so that the whirling movement is established and maintained and an annular body of liquid is established, and a cylindrical discharge duct leading downward from a point of the chamber substantially at the axis thereof and in which the liquid passes downwardly as a whirling body, said duct terminating below the maintained minimum liquid level in the tank so that the whirling body of liquid in the duct is discharged into the maintained body of liquid in the tank, and an opening in said chamber, said opening communicating with the atmosphere above the maximum liquid level in said tank.

2. A vacuum-breaking device by which liquid may be delivered from a supply valve to a tank, said tank having an overflow for fixing the maximum liquid level therein and also having a discharge conduit and means for fixing a minimum liquid level therein, comprising a structure having a chamber in which a body of the liquid may be set into whirling movement, means for supplying water at high velocity into said chamber in a direction substantially tangential to the internal peripheral wall surface thereof so that the whirling movement is established and maintained, a discharge duct leading from the chamber substantially at the axis about which the liquid whirls and communicating with the tank at a point below the minimum level therein, and a further opening communicating with the atmosphere above said maximum liquid level and communicating with the chamber substantially at the axis of the movement of the whirling body of liquid therein, said discharge including a duct having a baffle therein spaced from the internal wall surfaces thereof for limiting the movement of air in said duct.

3. A quiet flow retarding and vacuum-breaking device for discharging liquids into a tank, said tank having an outflow orifice located above the bottom of the tank so that a minimum liquid level is established and also having an overflow by which a maximum liquid level is established, comprising a structure having a chamber in which the body of the liquid may be set into whirling movement about a vertical axis between confining end walls, means for supplying water at high velocity into said chamber in a direction substantially tangential to the internal peripheral wall surface thereof so that the whirling movement is established and maintained, said chamber and means being constructed and arranged so that the whirling movement occurs about a substantially vertical axis, upper and lower openings in the end walls of the chamber substantially concentric with said axis, and a cylindrical discharge duct leading vertically downward from the lower opening and terminating below the minimum level in the tank, said upper opening being located above the maximum liquid level in the tank.

4. A quiet flow retarding device for liquids, comprising a chambered structure in which a body of liquid may be set into whirling movement between confining end walls, means for supplying liquid at high velocity into said chamber, said means including a conical port with its smaller end opening into the chamber and with the axis of the port substantially tangential to the internal peripheral wall surface of the chamber so that a whirling movement of a body of liquid is established and maintained and also including a regulating needle valve having a conical portion cooperative with the conical port wall to provide a restricted passageway by which the liquid is constrained to enter the chamber at a high velocity, and a straight cylindrical discharge leading from the chamber concentric with the axis of the whirling body of liquid.

5. A quiet flow retarding device for liquids, comprising a structure having a cylindrical chamber with substantially radial end wall surfaces, means for supplying liquid into said chamber including a conical port with its small end opening into the chamber, the axis of the port being substantially tangential to the internal peripheral wall of the chamber, said means also including a regulating needle valve cooperative with the conical port wall to provide a restricted passageway by which the liquid is constrained to enter the chamber at a high velocity and produce a whirling body of liquid therein with the incoming liquid entering the chamber at a region of high pressure therein, one end wall having a discharge duct concentric with the chamber, so that the innermost portion of the whirling body of liquid may enter the discharge duct and pass therealong substantially in the form of an annular body of revolution, said discharge duct including means effective for retarding the flow of liquid therethrough.

6. A quiet flow retarding device for liquids, comprising a body having a first chamber, a second chamber in said body in which a body of liquid may be set into whirling movement about a vertical axis and between confining end walls, a port communicating between said chambers, and a regulating valve means having a part located in said port and cooperative with the walls thereof for providing a restricted passageway and thereby assuring a high velocity of flow of liquid from the first chamber into said second chamber at a prevailing liquid supply pressure in said first chamber, said port opening into said second chamber with its axis substantially tangential to the inner peripheral wall surface thereof; and a straight cylindrical discharge duct leading downward from the second chamber concentric with the axis of the whirling body of liquid.

7. A quiet flow retarding device for liquids, comprising a body having a first chamber, a second chamber in said body in which a body of liquid may be set into whirling movement about a vertical axis and between confining end walls, a recess extending laterally from said first chamber, a port communicating between said recess and said second chamber, and a regulating valve means extending across said recess and having a part located in said port and cooperative with the walls thereof for providing a restricted passageway and thereby assuring a high velocity of flow of liquid from said first chamber into said second chamber at a prevailing liquid supply pressure in said first chamber, said port opening into said second chamber with its axis substantially tangential to the inner peripheral wall surface thereof, and a straight cylindrical discharge duct leading downward from the second chamber concentric with the axis of the whirling body of liquid.

8. A quiet flow retarding device for liquids, comprising a structure having an open and unobstructed chamber with an internal periphery formed as a figure of revolution of restricted axial size about a vertical axis and having upper and lower end walls with substantially radial inner surfaces, means for supplying liquid at high velocity and in a restricted volume of flow into said chamber in a direction substantially tangential to the internal peripheral wall surface thereof so that the whirling movement is established and maintained, and a cylindrical discharge duct of lesser diameter than said chamber opening thereinto substantially at the axis of the inner surface of said lower end wall and leading vertically downward from the chamber, the chamber space radially outside the duct opening providing a circulation channel in which the liquid develops a peripheral velocity essentially equal to the linear velocity of the entering liquid whereby to develop a centrifugal pressure for preventing cavitation of the liquid entering said chamber, said duct having a roughened internal wall surface for retarding the peripheral velocity of liquid entering the duct from the chamber.

9. A quiet flow retarding device for liquids, comprising a structure having a substantially cylindrical chamber in which a body of the liquid may be set into whirling movement about a vertical axis between upper and lower confining end walls; means for supplying water at high velocity into said chamber; said means including a port opening into the chamber in a direction substantially tangential to the internal peripheral wall surfaces thereof so that the whirling movement is established and maintained, and a needle valve for varying the effective area of said port; a cylindrical discharge duct of lesser diameter than said chamber and opening through said lower end wall substantially at the axis thereof, and means comprising a roughened internal surface on said duct and effective for restricting the movement of the liquid in said discharge duct.

10. A quiet flow retarding device for liquids, comprising a chambered structure in which a body of the liquid may be set into whirling movement and including an end wall, means for supplying liquid at high velocity into said chamber in a direction substantially tangential to the internal peripheral surface thereof so that the whirling movement is established and maintained, a discharge conduit leading from the chamber substantially at the axis thereof and having a diameter smaller than the maximum diameter thereof, and a restricted duct extending from a point located in the end wall radially between the peripheral surface of the chamber and the inner surface of the discharge conduit for delivering a restricted quantity of liquid from said chamber independently of said discharge conduit.

11. A quiet flow retarding device for a tank having a discharge orifice located above the bottom of the tank whereby a water seal is maintained therein, a valve structure for controlling the delivery of water into the tank, and an overflow for determining the maxmium level of water in the tank, comprising a structure having a chamber in which a body of liquid may be set into whirling movement about a vertical axis, a restricted port through which water may be delivered from said valve structure into said chamber at high velocity and in a direction substantially tangential to the internal peripheral wall surface of the chamber so that whirling movement of an annular body of liquid is established and maintained, a cylindrical discharge duct leading downward from an opening in the chamber substantially at the axis thereof and in which the liquid passes downwardly as a whirling body, said duct terminating below the maintained minimum liquid level in the tank so that the whirling body of liquid in the duct is discharged into the maintained body of liquid in the tank, and an opening in said chamber communicating with the atmosphere above the maximum liquid level in said tank, and a refill tube for delivering water into the overflow and communicating with the chamber at a point radially between the said peripheral wall surface of the chamber and the said openings.

12. A quiet flow retarding device for liquids, comprising a chambered structure in which a body of the liquid may be set into whirling movement between confining end walls, means for supplying liquid at high velocity into said chamber in a direction substantially tangential to the internal peripheral surface thereof so that the whirling movement is established and maintained, and a discharge conduit leading from the chamber substantially at the axis thereof said discharge conduit having an internal wall surface provided with a roughening comprising elevations and depressions spaced one-sixteenth to one-eightieth of an inch apart in a peripheral direction and effective for quietly retarding the movement of the whirling body of liquid moving therein.

13. A quiet flow retarding device for liquids, comprising a chambered structure in which a body of the liquid may be set into whirling movement about a vertical axis and between upper and lower confining end walls, means for supplying liquid at high velocity into said chamber in a direction substantially tangential to the internal peripheral surface thereof so that the whirling movement is established and maintained, said structure having a free opening to the atmosphere substantially at the axis of the upper end wall, and a discharge conduit leading downwardly from the chamber substantially at the axis of the lower end wall said discharge conduit having an internal wall surface provided with a roughening comprising elevations and depressions spaced one-sixteenth to one-eightieth of an inch part in a peripheral direction and effective for quietly retarding the movement of the whirling body of liquid moving therein.

14. A quiet flow retarding device for liquids, comprising a structure having a cylindrical chamber with a vertical axis and having upper and lower radial end wall surfaces, means for supplying liquid at high velocity into said chamber in a direction substantially tangential to the internal peripheral wall surfaces thereof so that the whirling movement is established and maintained, and a long cylindrical discharge duct of lesser diameter than the chamber and extending from the said lower end wall surface in a downward direction concentrically with the axis of the cylindrical chamber, said upper end wall having therein a free opening of a diameter smaller than the internal diameter of said duct the internal surface of the duct having a roughening comprising elevations and depressions spaced one-sixteenth to a one-eightieth of an inch apart in a peripheral direction and effective for quietly retarding the movement of the whirling body of liquid moving therein.

15. A quiet flow retarding device for liquids, comprising a structure having a chamber with an internal periphery formed as a figure of revolution about a vertical axis and having an end wall with a substantially radial inner surface, means for supplying liquid at high velocity into said chamber in a direction substantially tangential to the internal peripheral wall surfaces thereof so that the whirling movement is established and maintained, and a cylindrical discharge duct of lesser diameter than said chamber leading vertically downward from the chamber substantiailly at the axis of the whirling body of liquid, said discharge duct having a plurality of ribs on the internal surface thereof and extending in a longitudinal direction, said ribs having the form of screw threads with a pitch of 16 to 80 per inch and being effective for retarding the movement of the whirling body of liquid during its course along said discharge duct for causing liquid to collect in the lower end of the tube and preventing air being carried downward to the end of the duct.

16. A quiet flow retarding device for liquids, comprising a chambered structure in which a body of liquid may be set into whirling movement about a vertical axis between upper and lower confining end walls, means for supplying liquid at high velocity into said chamber in a direction substantially tangential to the internal peripheral wall surface thereof so that the whirling movement is established and maintained, said structure having a free opening to the atmosphere substantially at the axis of the upper end wall, a discharge duct leading downward from the chamber substantially at the axis of the lower end wall and having a free opening at the periphery of its lower end, and means effective for preventing the downward passage of air to the lower end of said duct.

17. A quiet flow retarding device for liquids, comprising a chambered structure in which a body of liquid may be set into whirling movement between confining end walls, means for supplying liquid at high velocity into said chamber in a direction substantially tangential to the internal peripheral wall surfaces thereof so that the whirling movement is established and maintained, a cylindrical discharge duct of smaller diameter than the chamber and leading downward from the chamber substantially at the axis of the whirling body of liquid and in which the liquid in said chamber passes downward in a continued whirling movement as a relatively thin sheet, and a baffle of circular section concentrically arranged with relation to the axis of said cylindrical discharge duct for limiting the downward movement of air at the center of said duct.

18. A quiet flow retarding device for liquids, comprising a chambered structure in which a body of liquid may be set into whirling movement between confining end walls, means for supplying liquid at high velocity into said chamber in a direction substantially tangential to the internal peripheral wall surfaces thereof so that the whirling movement is established and maintained, a cylindrical discharge duct leading from the chamber substantially at the axis of the whirling body of liquid, and a cylindrical structure supported by the chambered structure and concentrically mounted in said discharge duct for providing an annular space for the movement of the liquid and extending beyond the open end of said duct.

WALKER F. PETERSON.
ALBERT U. WALTER.